Figure 4:
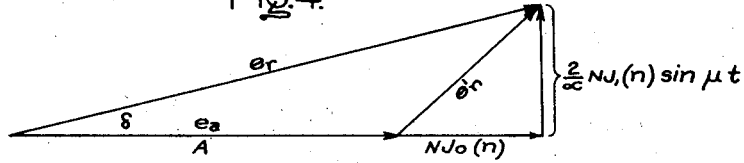

Jan. 27, 1942.                H. RODER                2,270,899
                    FREQUENCY MODULATION SYSTEM
                Filed Nov. 12, 1938          2 Sheets-Sheet 1
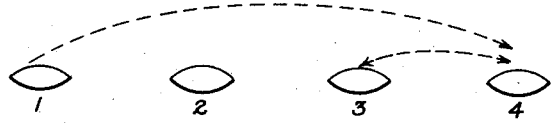
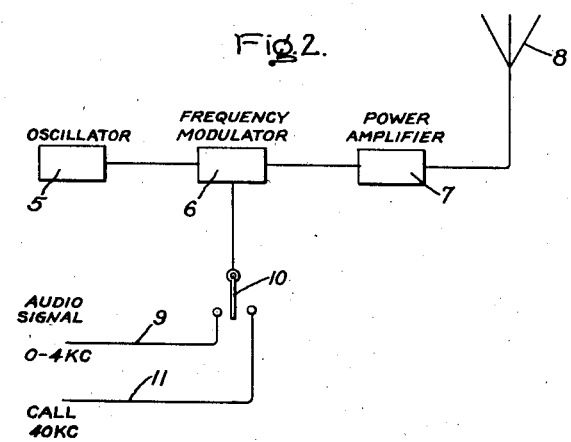
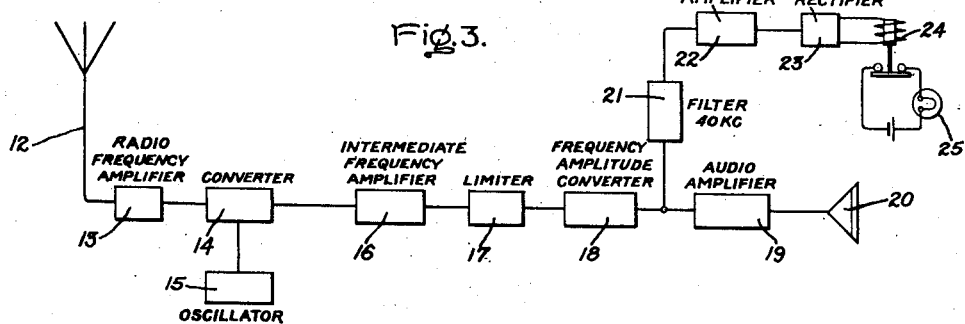
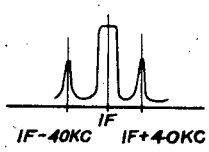
Inventor:
Hans Roder,
by Harry E. Dunham
His Attorney.

Jan. 27, 1942.                H. RODER                 2,270,899
                    FREQUENCY MODULATION SYSTEM
                      Filed Nov. 12, 1938        2 Sheets-Sheet 2

Inventor:
Hans Roder,
by Harry E. Dunham
His Attorney.

Patented Jan. 27, 1942

2,270,899

UNITED STATES PATENT OFFICE 2,270,899

FREQUENCY MODULATION SYSTEM

Hans Roder, Schenectady, N. Y., assignor to General Electric Company, a corporation of New York Application November 12, 1938, Serial No. 240,143

14 Claims. (Cl. 250—6)

My invention relates to frequency modulation systems and more particularly to the use of such systems in situations where the interference suppression property of frequency modulation transmission might render this type of transmission undesirable.

Frequency modulation receivers of the broad band modulation type have the now well-known property of favoring the reception of signals of the larger intensity to the exclusion of signals of lesser intensity. That is, of two received signals, one twice as strong as the other, the receiver will receive the stronger to the almost total exclusion of the other. In this way the weaker signal is incapable of interfering with reception of the stronger.

This property of transmission by frequency modulation is an extremely important and desirable one in most situations. It, however, is likely to render this type of transmission inapplicable in other situations. An object of my invention is to render this type of transmission applicable to such other situations.

One such situation arises in connection with the communication between the vessels of a fleet for example. It may occur that two vessels of the fleet located at close range are communicating by frequency modulation. Another vessel, which may be the flagship, or commanding vessel of the fleet, desires to communicate with one of these already communicating vessels. All of the vessels of the fleet may be assumed to be equipped with similar radio equipment operating at the same power and frequency with the result that, due to the greater distance of the commanding vessel from the vessel with which it wishes to communicate, it is unable to break into the communication with that vessel which is already going on. That is, the receiver of that vessel inherently excludes the signal from the flagship in favor of the stronger signal from the nearer vessel. One of the objects of my invention is to provide means whereby such break-in may be effected.

The novel features which I believe to be characteristic of my invention are set forth with particularity in the appended claims. My invention itself, however, both as to its organization and method of operation may best be understood by reference to the following description taken in connection with the accompanying drawings in which Fig. 1 illustrates an application of my invention; Fig. 2 conventionally represents the transmitter to be employed; Fig. 3 represents the receiver; and Figs. 4, 5, 6, 7 and 8 represent certain characteristics pertaining to the invention.

Referring to Fig. 1 of the drawings, I have represented at 1, 2, 3 and 4 what may be considered to be the vessels of a fleet. If we assume that vessels 3 and 4 are communicating, or that vessel 4 is receiving signals from vessel 3 by frequency modulation, and that the fleet commandant desires to signal the vessel 4, it will be found that he will be unable to do so if his vessel is positioned such that the signals radiated thereby are received by the receiver on vessel 4 with an intensity of less than substantially one-half of the intensity with which currents of vessel 3 are received.

In accordance with my invention, means are provided whereby a signal may be transmitted from any of the vessels such as vessel 1, to any of the other vessels, such as vessel 4, which is capable of reception thereby even while the signaled vessel is receiving signals from a different vessel, or different transmitting station of far greater signal intensity.

The transmitter of my equipment, which is indicated conventionally in Fig. 2, comprises an oscillator 5 which generates a carrier wave which is frequency modulated by the modulator 6 amplified by power amplifier 7, and radiated by antenna 8. This frequency modulator is supplied with a normal voice communication signal, which may comprise currents having frequencies extending over the range from zero to 4 kilocycles, and which are supplied over a circuit 9 and switch 10, in its left-hand position, to the input circuit of the modulator. By operating switch 10 to its right-hand position the modulator may also be supplied with currents of a different and much higher frequency, as for example 40 kilocycles, which are supplied thereto over circuit 11. These currents may be referred to as calling currents since they are used to attract the attention of the operator on the called vessel before transmission of the message to be communicated to that vessel.

The frequency modulator 6 may be one which, when supplied with currents of the normal audio signal frequency, such as voice currents, shifts the frequency of the carrier wave by plus and minus 25 kilocycles, for example for 100% modulation and which, when supplied with the calling currents of 40 kilocycles, shifts the frequency of the carrier wave by, for example, plus or minus 64 kilocycles. Of course, the power amplifier and antenna must also be designed to transmit the carrier wave when so modulated.

The receiver may be the conventional frequency modulation receiver comprising, as shown in Fig. 3, an antenna 12, radio frequency amplifier 13, converter 14, local superheterodyne oscillator 15, intermediate frequency amplifier 16, amplitude limiter 17, frequency amplitude converter 18, output audio frequency amplifier 19, and a suitable loudspeaker 20. The carrier wave is received on antenna 12, amplified by amplifier 13, and converted to a suitable intermediate frequency by the converter 14. The intermediate frequency amplifier 16 is arranged to transmit this intermediate frequency plus frequencies within a band of 25 kilocycles above or below the intermediate frequency. These currents are supplied to the limiter 17, which operates to remove any amplitude modulations, so that all currents in the output of limiter 17 are of equal amplitude. These currents, which during normal audio frequency communication, in the example mentioned, vary in frequency from a frequency of 25 kilocycles below the intermediate frequency to a frequency of 25 kilocycles above the intermediate frequency are supplied to the frequency amplitude converter whereby these currents of varying frequency are converted to currents of varying amplitude, the amplitude of the output currents being linearly proportional to the frequency of the currents at the input of the converter. These output currents, which, during normal communication, include the voice frequencies are amplified by the audio amplifier 19 and supplied to the loudspeaker 20 for reproduction thereby.

Connected to the output of the frequency amplitude converter 18 is a filter 21 which is designed to pass the calling currents of 40 kilocycles and to exclude currents of audio frequency. Currents of the 40 kilocycle frequency which pass through the filter 21 are amplified by amplifier 22 and rectified by a rectifier 23. The rectified currents may be employed to operate a relay 24 which, when energized, causes the lighting of a lamp 25 or operation of any other suitable indicating device.

The vessels 1, 2, 3, and 4 may be as previously stated, assumed to be provided with transmitters and receivers of the form shown in Figs. 2 and 3, and which operate on the same carrier wave frequency and with the same power output. Prior to transmission of normal signals, the operator of the transmitter operates switch 10 to the right for a short interval and thereby transmits the carrier wave modulated by the 40 kilocycle calling current, which in turn produces a frequency shift of the carrier of 40 kilocycles. When these currents are received upon any other vessel, the lamp 25 on that vessel becomes lighted. The operator then shuts down the transmitter to receive the signal or to permit reception of the signal by other vessels near by. Thus, if during communication between vessels 3 and 4 the lamp 25 on these vessels becomes lighted by reason of a 40 kilocycle call signal transmitted by the commandant's vessel 1 which may be at a considerably greater distance from vessels 3 and 4 than these vessels are apart, the operators on vessels 3 and 4 stop their transmitters to listen to the message from vessel 1 which may then be transmitted by operation of switch 10 to the left. Thereafter communication between vessel 1 and the vessel called thereby may take place.

The normal frequency modulation receiver is capable of affording adequate reception of currents of the calling frequency without any modification, provided that the channel 21, 22, 23 be connected thereto to filter out the 40 kilocycle currents and to amplify and detect them after they have been reproduced by the frequency amplitude converter. This is true even though the intermediate frequency amplifier 16 is one which is designed for the transmission of the 50 kilocycle band extending from 25 kilocycles below the intermediate frequency to 25 kilocycles above the intermediate frequency.

The fact that in the intermediate frequency channel during the calling period the nearest side band to the carrier is removed 40 kilocycles from the carrier combined with the fact that these circuits are designed only for transmission of the band extending to 25 kilocycles above and below the carrier would seem to render satisfactory reception of the calling currents out of the question. That satisfactory reception of such calling currents may be had, however, may be mathematically demonstrated as follows:

Assume that signal A produced by ship 3 is unmodulated. This unmodulated carrier produces a voltage $e_a$ at the input of the limiter of the receiver which may be expressed by the equation $$e_a = A \sin \omega t \qquad (1)$$

where $e_a$ is the voltage at the input to the limiter 17
A is a constant proportional to the amplitude of the carrier
$\omega = 2\pi f$ where $f$ is the frequency of the carrier wave, and
$t =$ time The signal N transmitted from the vessel 1 is assumed to be frequency modulated and produces a voltage at the receiver on vessel 4 which may be expressed by the equation $$e_n = N \sin(\omega t + n \sin \mu t) \qquad (2)$$

$e_n =$ voltage at the input to the receiver
N = a constant proportional to the amplitude of the carrier
$\mu =$ calling frequency $$n = \frac{\Delta \omega}{\mu} = \frac{\text{frequency shift of calling channel}}{\text{calling frequency}} \qquad (2a)$$

These signals are received at the receiver and are transmitted through the radio frequency amplifier, converter, and intermediate frequency amplifier, all of which possess selectivity and tend to reduce the transmission of the side band frequencies which are necessary to the reproduction of the signal. Since the calling frequency is very high relative to the normal signal, and the shift in carrier frequency produced by it is also high relative to the shift in carrier frequency produced by the normal signal, it is necessary to investigate the effect of this attenuation of the signal reproduced at the receiver.

To express the side bands of the calling signal mathematically, Equation 2 above may be expanded into its modulation vector form, which is as follows:

$$E_n = N \; J_0(n) \sin \omega t + 2J_1(n) \sin \mu t \cos \omega t + 2J_2(n) \cos 2\mu t \sin \omega t + \ldots \qquad (3)$$

In this equation the first term in the bracket corresponds to the carrier, the second term corresponds to the first two side bands, and the last term corresponds to the second two side bands. The $J_0(n)$; $J_1(n)$ ... etc. terms are Bessel's functions of the first kind, order 0, 1, 2, etc. and argument $n$.

With respect to the first pair of side bands let us assume that these currents are attenuated $\alpha$ times in the portion of the receiver prior to the limiter, that is $\alpha$ = attenuation of the first band The second pair of side bands are small in themselves and being still further removed from the carrier are very highly attenuated. Its effect is therefore small enough to be neglected in this analysis. The same reasoning holds for side bands of higher order. Thus limiting ourselves to the first two terms on the right-hand side of the equation, we may express the remainder of the signal which reaches the limiter as follows:

$$e'_n = N\left[\left(J_0(n) \sin \omega t + \frac{2J_1 n}{\alpha} \sin \mu t \cos \omega t\right)\right] \quad (4)$$

where $e'_n$ = remainder of the signal after side bands more removed than the first are neglected and the first side bands are attenuated to $\frac{1}{\alpha}$ of their intensity at the antenna.

The entire signal which enters the limiter is the sum of $e_a$ (Equation 1) and $e'_n$ (Equation 4). The limiter removes the amplitude variations and the frequency amplitude converter converts the frequency variations of $e_a + e'_n$ into amplitude variations.

In Fig. 4 these quantities $e_a$ and $e'_n$ are vectorially represented, the quantity $e_a$ having the amplitude A, the quantity $e'_n$ having the components $NJ_0(n)$ and $$\frac{2}{\alpha} NJ_1(n) \sin \mu t$$

and the resultant of these quantities being represented by the vector $e_r$. This diagram represents the optimum condition when the two vectors $e_a$ and $NJ_0(n)$ are in phase.

Now, during each half cycle of the calling frequency the vector $$\frac{2}{\alpha} NJ_1(n) \sin \mu t$$

changes its length in accordance with the variation of the quantity $\sin \mu t$. Angle $\delta$ between the resultant vector $e_r$ and the normal signal A thus oscillates from positive to negative with respect to vector A, but is never large due to the fact that the quantity $e'_n$ is always small as compared with the quantity A, since N is smaller than A.

From the triangle of Fig. 4 the following relation appears:

$$\tan \delta = \pm \frac{\frac{2}{\alpha} NJ_1(n) \sin \mu t}{A \pm NJ_0(n)} \quad (5)$$

The ± sign in Equation 5 is used since $NJ_0(n)$ may be either in phase with $e_a$ (as shown in Fig. 4) or 180° out of phase with it.

Since the angle $\delta$ is always found to be small, it is permissible to put $$\tan \delta = \delta$$

After substitution of the relation and rearranging $$\delta = \frac{1}{\alpha} \frac{N}{A} \frac{2J_1(n)}{1 \pm \frac{N}{A} J_0(n)} \sin \mu t \quad (6)$$

$\delta$ represents the phase variation of the resulting signal $e_r$. We now obtain the frequency shift which occurs at the output of the limiter if we differentiate (6) with respect to time $$\frac{d\delta}{dt} = \left[\frac{N}{A} \frac{2J_1(n)}{1 \pm \frac{N}{A} J_0(n)} \frac{\mu}{\alpha}\right] \cos \mu t \quad (7)$$

The bracketed term expresses the shift in frequency at the input to the frequency amplitude converter which occurs during the transmission of the calling currents and which is available for utilization to operate the calling signal device at the receiver such as relay 24. This shift in frequency cannot be equal to the shift in frequency produced at the transmitter but is less due to the effect of the selectivity of the receiver. It must, however, be of sufficient magnitude for reliable operation of the signal device 24 even when the calling vessel I is at much greater distance from vessel 4 than vessel 3 is, with which vessel 4 is carrying on communication. From this equation we can calculate what this shift is for different relative intensities of received signals, calling frequencies, shift in carrier frequency produced by the calling frequency, different values of attenuation in the receiver, etc.

The bracketed term in Equation 7 is the product of three factors.

The first factor $$\frac{N}{A}$$

simply expresses the ratio of the field strength of the calling signal from vessel I to the field strength of the unmodulated carrier from vessel 3, both measured at the receiver input on vessel 4. It will be seen that the shift in frequency at the input to the frequency amplitude converter is directly proportional to the strength of the signal from vessel I and inversely proportional to the strength of the signal from vessel 3.

The second factor $$\frac{2J_1(n)}{1 \pm \frac{N}{A} J_0(n)}$$

is a function of the quantity $n$, which was defined above in Equation 2a as $$\frac{\Delta \omega}{\mu}$$

Figure 5:
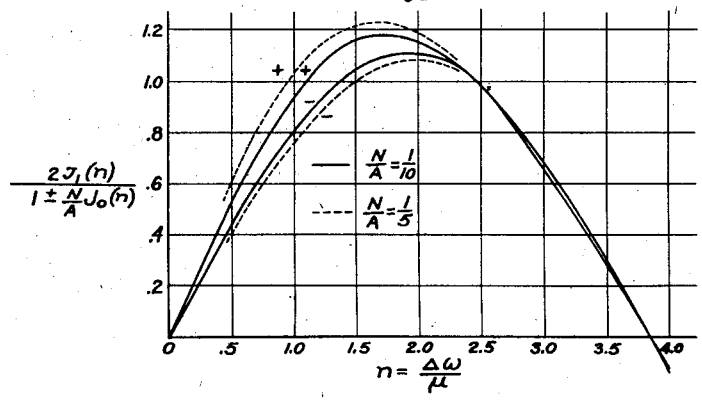

Fig. 5 shows curves for this term with $$2J_1(n) / \left(1 \pm \frac{N}{A} J_0(n)\right)$$

plotted as ordinates and $n$ plotted as abscissas. The solid line curves are computed for $$\frac{N}{A} = \frac{1}{10}$$

and the dotted line curves for $$\frac{N}{A} = \frac{1}{5}$$

The signs + or − indicate whether the positive or the negative sign in the denominator of the above expression was used. The extremities of the various curves are not drawn in every case, but these portions of the curves are practically coincident. It is seen from Fig. 5 that the curves are not greatly affected by a change of $$\frac{N}{A}$$

On the other hand, it will also be observed from the curves that for each calling frequency there is an optimum shift in carrier frequency to produce maximum frequency shift at the frequency amplitude converter of the receiver.

Each one of the curves shown has a maximum. This is due to the Bessel function $J_1(n)$ which has a maximum at $n = 1.84$ as may be ascertained from any tables of such Bessel functions. This means that the shift in frequency should be 1.84 times the calling frequency. Of course, as seen from Fig. 5 this value may be varied between 1.00 and 2.5 without deviating too greatly from the optimum.

To make the frequency shift a maximum, the third factor $$\frac{\mu}{\alpha}$$

of the bracketed expression should also have an optimum, or maximum value. This factor expresses the relation between the calling frequency and the attenuation of the receiver, and its optimum value is therefore dependent upon the shape of the selectivity curve of the receiver. The attenuation $\alpha$ of the receiver, of course, increases as the frequency departs from the carrier frequency, the increase being at first slow and then more rapid in accordance with the normal selectivity curve in which the attenuation of the receiver is plotted against departures in frequency from the carrier frequency. The maximum of $$\frac{\mu}{\alpha}$$

occurs near the shoulder of the selectivity curve. Thus for any given receiver the optimum calling frequency which may be employed may be determined directly from the shape of the selectivity curve.

Figure 6:
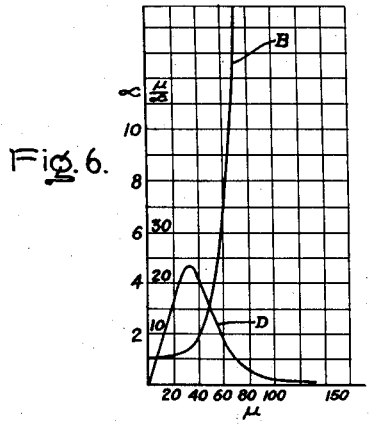
Figure 8:
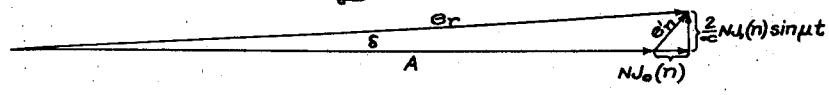

By way of a particular example, let us assume the receiver to have the selectivity characteristic indicated at B in Fig. 6 which expresses the relation between attenuation $\alpha$ plotted as ordinates and frequency deviation $\mu$, from the carrier plotted as abscissas. The curve D expresses the relation between the ratio $\mu/\alpha$ plotted as ordinates and frequency deviation from the carrier or $\mu$ plotted, as abscissas. These curves are chosen for illustration of the principles herein involved, only.

It is seen from curve B that the receiver receives the carrier wave and also side band currents having frequencies within a range of about twenty-five kilocycles thereof efficiently. This includes the entire range of shift in frequency of the carrier during normal transmission. Currents of frequencies farther removed from the carrier are highly attenuated, the curve having a definite shoulder between twenty-five and forty-five kilocycles removed from the carrier. Currents of frequency further removed from the carrier than forty-five or fifty kilocycles are effectively excluded by the tuned circuits of the receiver.

The curve D shows that the ratio $$\frac{\mu}{\alpha}$$

is largest just at this shoulder, its maximum being at about thirty-four kilocycles removed from the carrier. Thus, the frequency of calling currents should be chosen in this range to produce maximum reception, the value 34 kilocycles being optimum. However, to facilitate design of filter 21 it may be desirable to choose the calling frequency in the outer portion of this shoulder as for example 40 kilocycles i. e. $\mu = 40$.

Now, let us choose $n$ equal to 1.6 which is near the maxima of the curves of Fig. 5. Thus $$\Delta\omega = n\mu = (1.6)(40) = 64 \text{ kilocycles}$$

In other words, we choose a calling frequency of 40 kilocycles and shift the carrier frequency of the transmitter on vessel 1 by ±64 kilocycles.

For $n = 1.6$, we find from tables of Bessel's functions, $$J_0(n) = 0.455$$
$$J_1(n) = 0.570$$

Now let the ratio $$\frac{N}{A}$$

which is the field strength ratio of the calling signal from vessel 1 with respect to that of the unmodulated carrier from ship 3 be 1:10. By substitution into (7) we find $$\frac{N}{A} \frac{2J_1(n)}{1+\frac{N}{A}J_0(n)} \frac{\mu}{\alpha} = \frac{1}{10} \frac{2(.57)}{1+0.0455} \frac{40}{1.9} = 2.30 \text{ kilocycles}$$

Thus, the optimum frequency shift of the carrier at the input to the frequency amplitude limiter during transmission of the calling signal is approximately 2.3 kilocycles.

This frequency shift occurs at the 40 kilocycle rate, and when detected by the frequency amplitude converter, which has a linear characteristic, produces currents of the 40 kilocycle frequency. These currents are, of course, filtered from the normal signal by filter 21, amplified by amplifier 22, rectified by rectifier 23, and caused to operate relay 24 which in turn cause the lamp to be lighted.

The receiver is, of course designed to transmit the carrier and normal side bands without substantial attenuation to the detector, i. e., the normal signal at the detector has a frequency shift of 25 kilocycles at 100% modulation of the transmitter. The calling signal which produces a shift in the carrier frequency at the detector of only 2.3 kilocycles, thus corresponds to $$\frac{2.3}{25} \cdot 100 = 9.2\%$$

modulation of the transmitter and produces in the output of the detector currents of amplitude corresponding to substantially this latter percentage of modulation. Such currents, if they were of the frequency of the normal communication currents, would produce very considerable interference, but instead they are of the frequency of 40 kilocycles and are not transmitted by the audio communication channel. They can be very satisfactorily filtered from that channel, however, and utilized to operate the signal device.

The value of 2.3 kilocycles shift in frequency obtainable at the input to the limiter represents the optimum frequency shift obtainable were the vectors $e_a$ and $NJ_0(n)$ continuously in phase. Actually, however, this condition exists only momentarily because the two carrier waves can never be maintained in any fixed phase relation for more than instantaneous intervals, the two waves, of course, continually varying in phase, and in fact, in frequency. This is especially true since the wave from vessel 3 is itself frequently modulated. Accordingly, to represent more accurately what occurs, the triangle made up of the three vectors $$e'_n, \frac{2}{\alpha}NJ_1(n) \sin \mu t, \text{ and } NJ_0(n)$$

must be considered to rotate bodily about the right hand end of vector $e_a$ at an instantaneous frequency equal to the difference between the instantaneous frequencies of the two carrier waves. As it rotates the angle $\delta$ changes positively and negatively about the vector $e_a$ this change representing the frequency modulation.

At only two positions, however, of the triangle is the vector $NJ_0(n)$ at right angles to vector $e_r$ and at only those positions is there no frequency shift. Accordingly, beginning with the triangle in the position shown, the frequency shift at the input to the limiter first drops slowly and then more rapidly, in a sinusoidal manner, as the triangle rotates until it is zero when vector $NJ_0(n)$ is at right angles to vector $e_r$. It then, first rapidly and then more slowly, but sinusoidally, increases to a maximum and then again drops to zero when the vector $NJ_0(n)$ is again at right angles to vector $e_r$. It then again increases to the optimum when the triangle returns to the initial position shown. Thus the quantity represented within the bracket in Equation 7 might be indicated as a succession of half sine waves all on one side of an axis, the frequency of these half sine waves being equal to the difference in frequency of the two carrier waves, and each half sine wave having a peak value of 2.3 kilocycles. The average instantaneous value of such a sine wave is 63% of the peak value. Therefore, the average frequency shift at the input to the limiter is 63% of 2.3 kilocycles or 1.45 kilocycles. This calling signal which produces an average shift in frequency of the carrier at the input to the detector of 1.45 kilocycles, corresponds to an average percentage of modulation of the transmitter of 63% of 9.2, the value calculated above, or 5.8%. This reduction in the received signal is not sufficiently great materially to impair the reliability of the system or reduce its usefulness.

The fact that, in the example assumed the calling currents are received with useful intensity, becomes more striking if we redraw the vector diagram of Fig. 4 with proportions to fit the example given. This is done in Fig. 8 in which the various vectors are drawn with the relative lengths, which they would have if signals from vessel 1 were received at the input to the receiver on vessel 4 with 1/10 of the intensity of the signals received from vessel 3, and assuming that the selectivity of the receiver is as given by the curve B of Fig. 6. The angle $\delta$, the variations of which correspond to the frequency shift, is seen to be extremely small as in the neighborhood of three degrees as a maximum. The rate of this variation, however, is sufficiently large to make the resulting frequency shift sufficiently great for satisfactory reception notwithstanding the large discrepancy between the intensities of the two signals. In fact it is sufficiently great to produce current in the receiver comparable to the interference currents which would be produced were amplitude modulation employed.

Thus, were a tone transmitted from vessel 1 used for calling purposes, this tone having a frequency within the voice range of frequencies which the receiver of vessel 4 is primarily designed to receive, this tone, due to the inherent properties of frequency modulation, would not be heard on vessel 4 during reception on vessel 4 of signals having intensity greater than about twice the intensity of the calling signal transmitted from vessel 1. Yet, if the calling current be made of higher frequency such that its side bands lie removed from the carrier further than the frequencies which the receiver is primarily designed to receive, and the above relations are complied with, this calling current may be received with suitable intensity for calling purposes even in the presence of carrier from another station of ten times greater intensity. This results from the high frequency of the calling current and the high shift in frequency of the carrier. In other words, the call is best transmitted through the narrow band circuits of the receiver, in the presence of the normal signal, if it be a wide band call, and if the frequency band be traversed at a high frequency rate.

The intensity of the received calling current will be increased, however, if the intermediate frequency amplifier of the receiver be one having the characteristic such as shown in Fig. 7 in which the horizontal scale represents frequency and the vertical scale represents transmission through the amplifier. The intermediate frequency is represented at the middle of the graph by the legend IF. The currents of 25 kilocycles above and below the intermediate frequency are transmitted substantially equally at frequencies farther removed from the carrier than 25 kilocycles the attenuation is very great until frequencies approaching 40 kilocycles removed from the carrier are attained. These frequencies are transmitted more efficiently thereby to increase the reception of the calling currents. For currents farther removed from the intermediate frequency than 40 kilocycles, the attenuation is again high.

While I have mentioned a 25 kilocycle shift in frequency for normal transmission and a 64 kilocycle shift in frequency for the call, it will of course be understood that these shifts in frequency may vary widely and are mentioned only by way of a particular example. Similarly, the calling frequency may be varied widely, but should be high relative to the highest frequency of the normal signals.

While I have shown a particular embodiment of my invention it will, of course, be understood that I do not wish to be limited thereto since different modifications may be made, and I contemplate by the appended claims to cover any such modifications that fall within the true spirit and scope of my invention.

What I claim as new and desire to secure by Letters Patent of the United States, is:

1. The method of signalling by frequency modulation from one station to another station which is receiving signals from a third station having the same carrier frequency as that transmitted by said one station and having intensity more than twice as great as the intensity of signals received from said one station, which includes the steps of frequency modulating the carrier wave of said one station, by an amount greater than the frequency modulation of the signals received from the third station and at a rate greater than the rate of frequency modulation of the signals from said third station, and receiving said signals in said other station.

2. The method of transmitting a desired signal through a receiver adapted for reception of a carrier wave having its frequency modulated with a second desired audio frequency signal notwithstanding reception in said receiver of said carrier wave modulated with said audio frequency signal, said receiver having selectivity circuits adapted to pass most effectively only the band of frequencies produced by said audio frequency signal, which includes the step of modulating a carrier wave of the same frequency with currents representing said first desired signal and producing a substantially wider band of frequencies than are produced by said audio frequency signal, applying said wider band of frequencies to said selectivity circuits, detecting the output from said selectivity circuits and filtering currents representing said first desired signal from currents representing said audio signal after detection.

3. In a frequency modulation signaling system including a receiver having the inherent property of suppressing interfering signals having intensity less than about half of the desired signal being received, the method of transmitting a second desired signal of weak intensity through said receiving system during reception therein of a strong carrier modulated with a first desired signal notwithstanding said inherent property, which includes modulating a second carrier with currents representing said second desired signals, said currents having a frequency whose ratio to the attenuation of the receiving system is substantially a maximum, and supplying said second carrier to said receiving system in the presence of a said strong carrier and reproducing said second desired signals from currents transmitted through said receiver.

4. The method of receiving signals in a carrier wave frequency modulation receiver having selectivity circuits tuned to the carrier wave, the attenuation of said circuits being substantially constant over a narrow range of frequencies and then rapidly rising, which includes modulating said carrier wave with currents having such a frequency that the ratio of said frequency to the attenuation of said circuits at a frequency departure from the carrier frequency equal to said modulation frequency is a maximum.

5. The method of transmitting desired signals through a carrier wave frequency modulation receiver having selectivity circuits tuned to the carrier wave to be received, the attenuation of said circuits being a minimum for currents of said carrier frequency and increasing first slowly and then more rapidly for currents having frequencies departing from said carrier frequency, the curve expressing the relation between attenuation and frequency thus having a definite shoulder therein, which includes modulating a carrier wave of said carrier frequency with currents having a frequency equal to the departure from said carrier frequency substantially at said shoulder of a frequency at which said more rapid increase begins.

6. In combination, a transmitter adapted to transmit a carrier wave the frequency of which is modulated over a predetermined range in accordance with desired signal currents, a receiver adapted to receive currents having frequencies within said range and to reproduce said signal currents therefrom, said receiver having selective circuits designed to pass said range of frequencies and increasingly to attenuate currents having frequencies increasingly removed from said range, means to modulate said carrier wave over a broader range of frequency with currents of higher frequency than said signal currents, said higher frequency and the extent of said broader range of frequency being chosen in accordance with the selectivity characteristic of said receiver to reproduce said higher frequency currents in said receiver with desired intensity simultaneously with reception of undesired currents of the same carrier frequency in said receiver having intensity greater than twice the intensity of currents received from said transmitter, and means to transmit said carrier wave modulated by said last means through said selective circuits.

7. In combination, a frequency modulation radio receiver having selective circuits designed for adequate transmission of a carrier wave frequency modulated at an audio rate and to have desired selectivity to such carrier wave, of means for transmitting a second signal through said circuits in the presence of reception of the frequency modulated carrier which said receiver is designed to receive, said means including a transmitter including means to transmit a carrier wave of substantially the same frequency as said first-mentioned carrier modulated in frequency over a range of frequencies so broad that currents having frequencies in the extremities of said range are attenuated due to the selectivity of said circuits, said modulation being at a rate determined by a frequency higher than the highest frequency to be transmitted by said circuits during reception by said audio modulated wave, whereby during simultaneous reception of both of said carriers with the first carrier having stronger intensity a sufficient band of frequencies is produced at the output of said selectivity circuits for adequate reception of said second signals.

8. The method of transmitting a weak calling signal through a narrow band pass network during transmission therethrough of communication signals of strong intensity, which includes modulating the frequency of a carrier wave passed by said network over a range substantially wider than the range of frequencies which said network is designed to pass in accordance with the calling signal to be transmitted, applying said carrier wave and its modulation side bands to said network whereby during reception of said strong communication signals the range of frequencies appearing at the output of said network due to said weak calling currents is sufficiently broad for adequate reception, and reproducing said calling signal from the frequency variations present at the output of said network produced by said modulation.

9. The method of transmitting a calling signal through a narrow band pass network, whereby the range of frequencies appearing at the output of said network is substantially narrower than the range applied to said network, which includes modulating the frequency of a carrier wave having a frequency lying near the middle of the pass band of said network over a range wider than the range of frequencies which said network is designed to pass during said transmission of normal signals with currents having a frequency equal to the difference between the carrier frequency and a frequency lying near the shoulder of the frequency attenuation characteristic of the network, transmitting the modulated carrier through said network and reproducing said calling signal from the frequency variations at the output of said network produced by said modulation.

10. The method of transmitting a signal through a narrow band pass network, passing efficiently a certain band of frequencies, passing inefficiently an additional marginal band of frequencies on either side of and adjacent to said certain band of frequencies, and substantially excluding frequencies beyond said marginal bands, which includes modulating the frequency of a carrier wave having a frequency intermediate said certain frequency band with currents representing said signal, said currents having a frequency equal to the difference between the frequency of said carrier and a frequency spaced well out in one of said marginal bands from the carrier frequency, said carrier being shifted in frequency by said modulation an amount at least as great as the frequency of said currents, applying said modulated carrier wave to said network, and reproducing the desired signal from the modulated carrier as it appears at the output of said network.

11. In a system for intercommunication between a plurality of radio stations operating on the same carrier wave frequency by modulation of the frequency of said carrier wave for communication in accordance with signals to be transmitted, and in which the receiving systems are designed for reception of such frequencies as are necessary to reception of such signals with desired selectivity, each receiver having the inherent property of excluding interference by electromotive forces having intensity less than a predetermined fraction of the intensity of a carrier wave being received, the method of calling one of two intercommunicating stations from a third of said stations so distant from the called station that its carrier wave is received at said called station with intensity less than said predetermined fraction of the signals then received from the other of said two intercommunicating stations, which includes modulating the carrier frequency of said distant station over a range wider than the range employed in said communication between said stations with calling currents, detecting said currents at the output of the selection means employed in said communication, at the called station, and operating a signal thereby.

12. In a system for intercommunication between a plurality of radio stations operating on the same carrier wave frequency by modulation of the frequency of said carrier wave for communication in accordance with signals to be transmitted, and in which the receiving systems are designed for reception of such frequencies as are necessary to reception of such signals with desired selectivity, each receiver having the inherent property of excluding interference by electromotive forces having intensity less than a predetermined fraction of the intensity of a carrier wave being received, the method of calling one of two intercommunicating stations from a third of said stations so distant from the called station that its carrier wave is received at said called station with intensity less than said predetermined fraction of the signals then received from the other of said two intercommunicating stations, which includes modulating the carrier frequency of said distant station over a range wider than the range employed in said communication between said stations with calling currents having a frequency greater than the shift in carrier frequency produced during said communication, and detecting said currents in the output of the selection means of the called station employed in said communication, and operating a signal thereby.

13. In a system for intercommunication between a plurality of radio stations operating on the same carrier wave frequency by modulation of the frequency of said carrier wave for normal communication in accordance with signals to be transmitted, the method of calling one of two intercommunicating stations from a third of said stations so distant from the called station that its carrier wave is received at said called station with intensity less than half of the intensity of signals then received from the other of said two intercommunicating stations, which includes modulating the carrier frequency of said distant station over a range wider than the range employed in normal communication between said stations with calling currents having a frequency greater than the shift in carrier frequency produced during said normal communication, the shift in frequency of the carrier being at least as great as the frequency of the calling currents but not greater than 2.8 times said calling current frequency, detecting said currents at the output of the selection means employed in the called station in said normal communication, and operating a signal thereby.

14. The method of transmission of a signal represented by a current of predetermined frequency through a band pass network having a predetermined selectivity characteristic, which includes the step of modulating a carrier wave having a frequency substantially at the middle of the pass band of said network with said currents, said currents having a frequency at which the ratio $\mu/\alpha$ is substantially a maximum, where $\mu$ represents the difference in frequency between the frequency of the carrier and any other frequency passed by said network, and $\alpha$ represents the attenuation of said circuit at the respective frequency, applying the modulated carrier to the input to said network, and reproducing the signal from the currents appearing at the output of said network.

HANS RODER.

CERTIFICATE OF CORRECTION.

Patent No. 2,270,899.                       January 27, 1942.

HANS RODER.

It is hereby certified that error appears in the printed specification of the above numbered patent requiring correction as follows: Page 2, second column, line 64, for "$E_n = N$" read --$e_n = N$--; page 4, second column, line 62, for "frequently" read --frequency--; page 6, first column, lines 47 and 48, claim 5, for "carrier frequency substantially at said shoulder of a frequency" read --carrier frequency of a frequency substantially at said shoulder--; and that the said Letters Patent should be read with this correction therein that the same may conform to the record of the case in the Patent Office.

Signed and sealed this 17th day of March, A. D. 1942.

(Seal)                               Henry Van Arsdale,
                                        Acting Commissioner of Patents.